INVENTOR.
ALAN R. CRIPE
BY

July 15, 1952  A. R. CRIPE  2,603,165
TRUCK FOR RAILROAD CARS OR THE LIKE
Filed Aug. 20, 1947  6 Sheets-Sheet 2
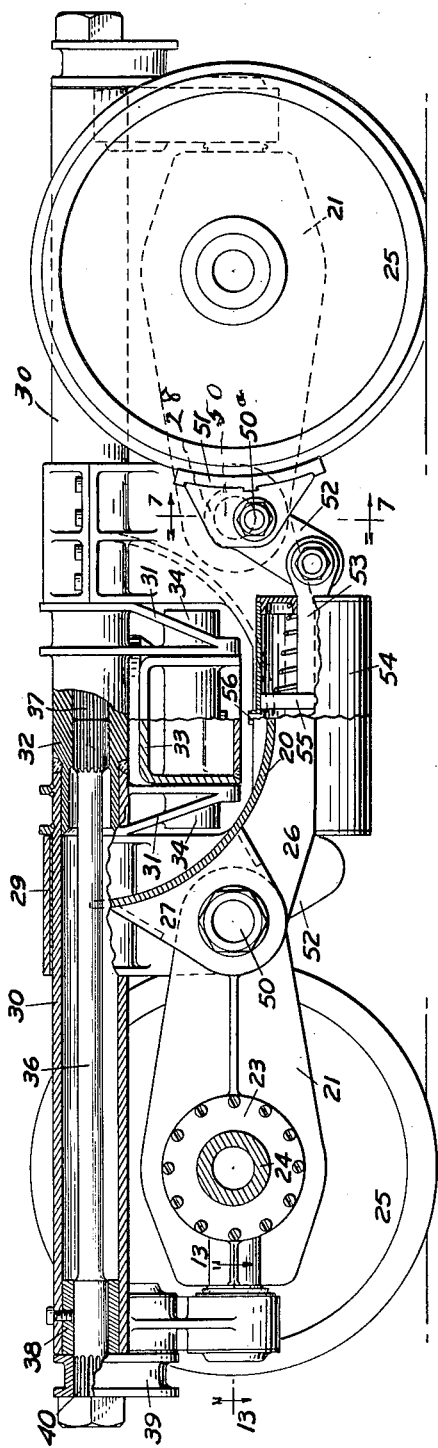
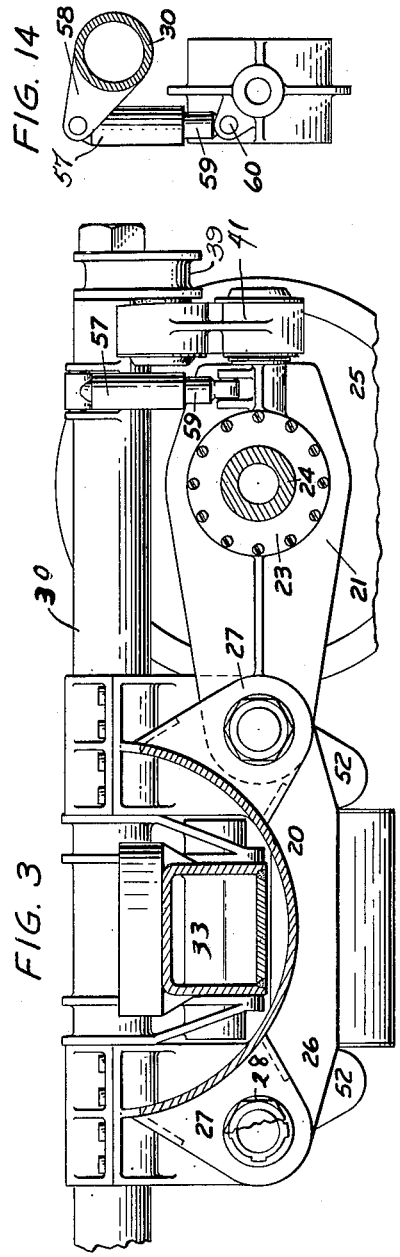
INVENTOR.
ALAN R. CRIPE
BY July 15, 1952 A. R. CRIPE 2,603,165
TRUCK FOR RAILROAD CARS OR THE LIKE
Filed Aug. 20, 1947 6 Sheets-Sheet 3

INVENTOR.
ALAN R. CRIPE
BY

Patented July 15, 1952

2,603,165

UNITED STATES PATENT OFFICE 2,603,165

TRUCK FOR RAILROAD CARS OR THE LIKE

Alan R. Cripe, Dayton, Ohio

Application August 20, 1947, Serial No. 769,672

5 Claims. (Cl. 105—185)

This invention relates to a vehicle truck and more particularly to a truck for a railroad car.

One object of the invention is to provide a truck which has efficient spring suspension for both loaded and unloaded cars.

A further object of the invention is to provide a truck having a minimum of unsprung weight.

A further object of the invention is to provide a truck having independent spring suspension for each of the several wheels, and in which shocks are absorbed close to the source of disturbance.

A further object of the invention is to provide a truck which is more stable than the usual truck, and which counteracts the tendency of the car body to "roll" on curves, that is, to sway the top of the car outwardly with relation to the truck due to centrifugal force.

A further object of the invention is to provide a truck having torsion rod spring suspension, and in which the torsion rod springs are protected.

A further object of the invention is to provide a truck with a resilient frame which will absorb shocks.

Other objects of the invention may appear as the truck is described in detail.

Figure 1:
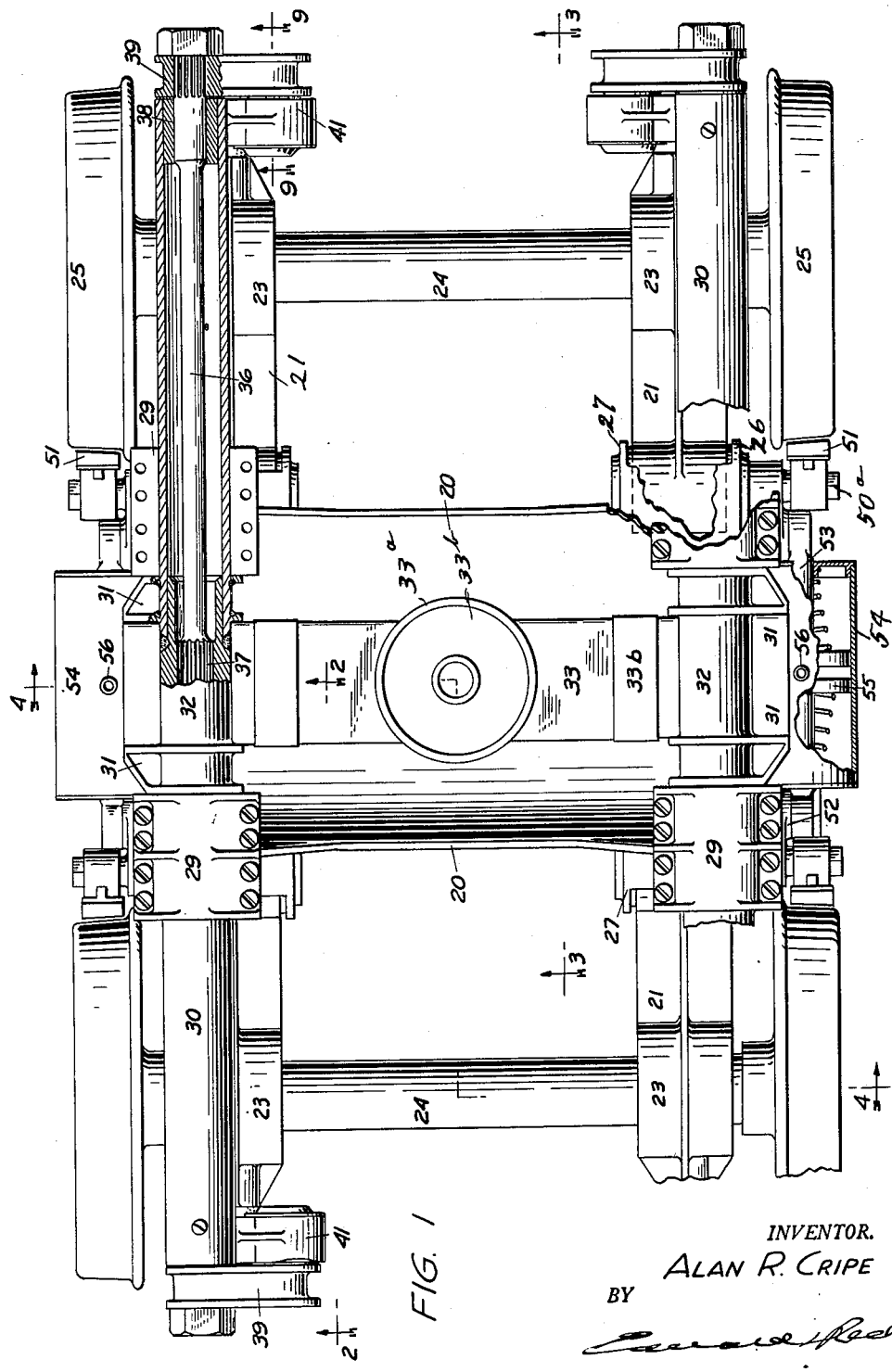
Figure 4:
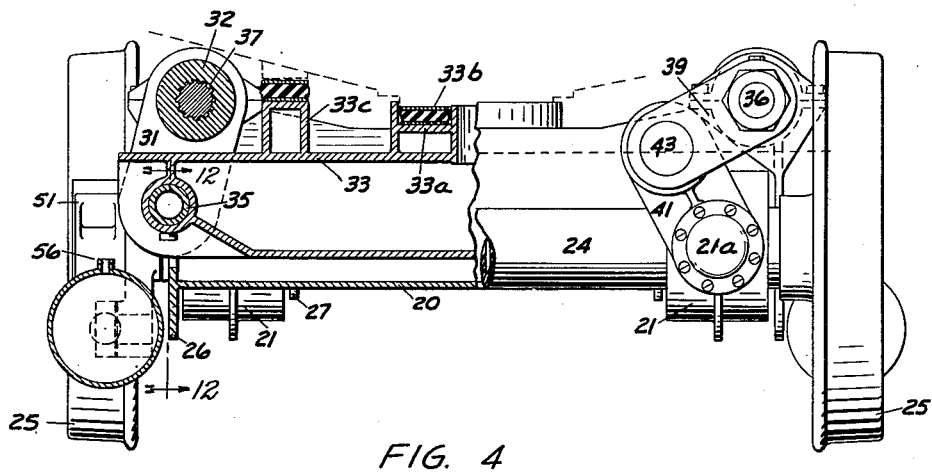
Figure 16:
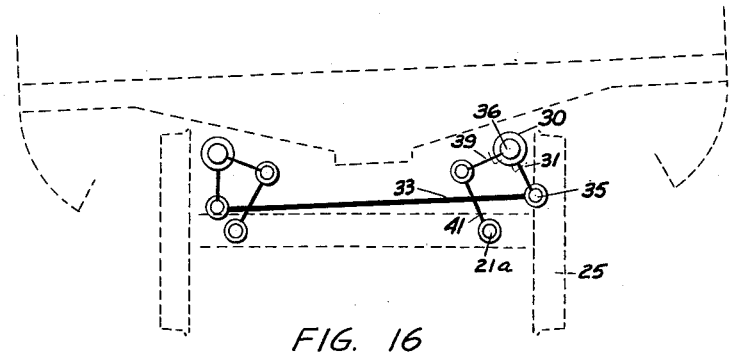
Figure 15:
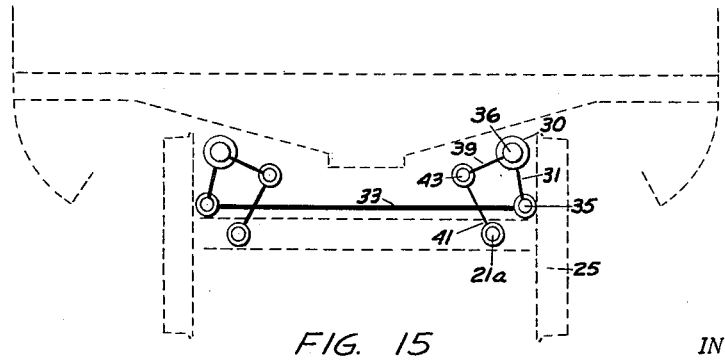
Figure 5:
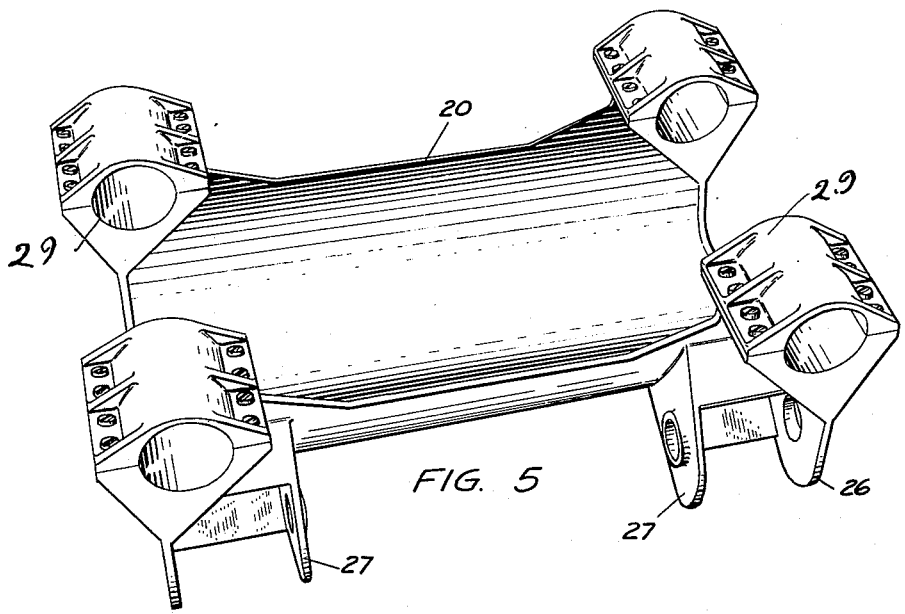
Figure 6:
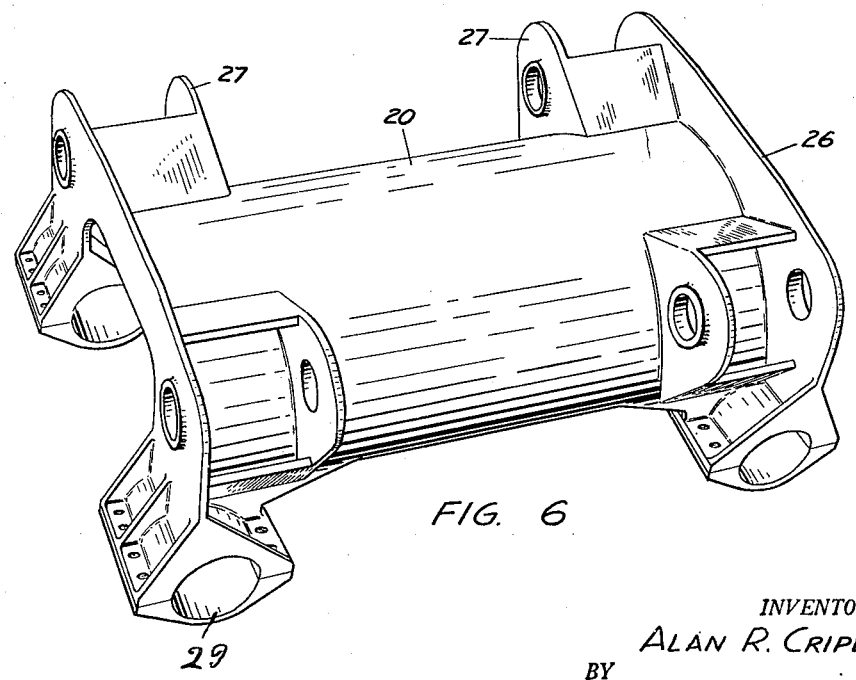
Figure 7:
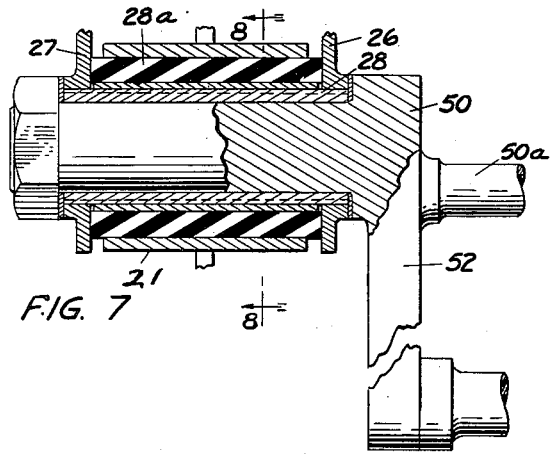
Figure 8:
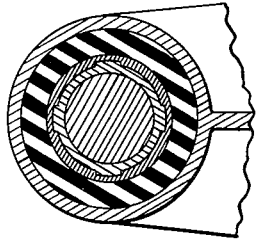
Figure 17:
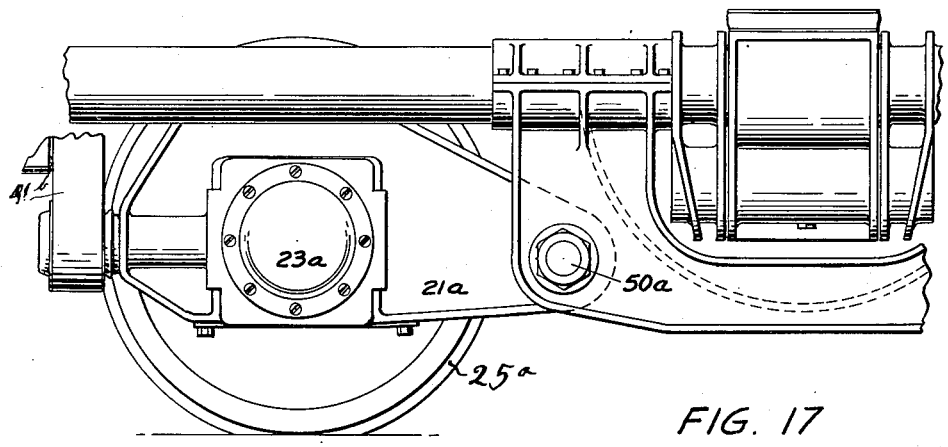
Figure 18:
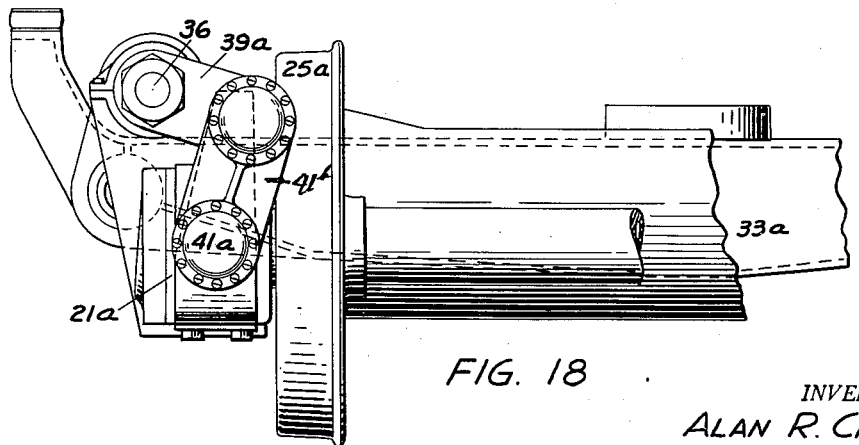
Figure 9:
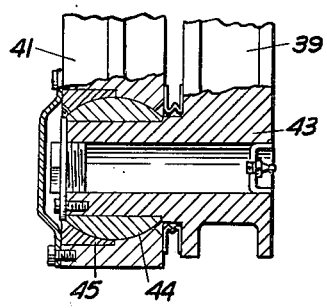
Figure 10:
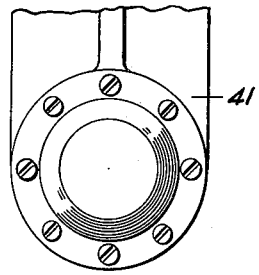
Figure 13:
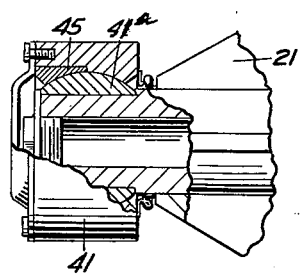
Figure 11:
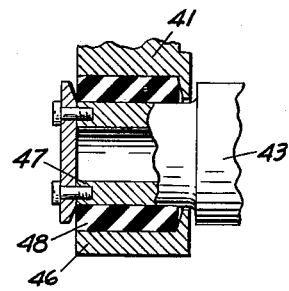
Figure 12:
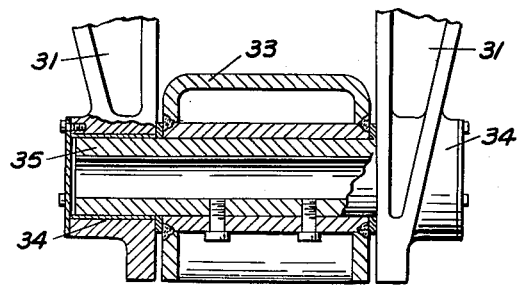

In the accompanying drawings Fig. 1 is a top plan view of a truck embodying the invention, partly in section and partly broken away; Fig. 2 is a side elevation of the truck partly in section on the line 2—2 of Fig. 1; Fig. 3 is a longitudinal section of a portion of the truck taken on the line 3—3 of Fig. 1; Fig. 4 is an end elevation, partly in section, on the line 4—4 of Fig. 1; Fig. 5 is a top perspective view of a truck frame; Fig. 6 is a bottom perspective view of the truck frame; Fig. 7 is a sectional detail of the brake shaft and its bearing taken on the line 7—7 of Fig. 2; Fig. 8 is a transverse section taken on the line 8—8 of Fig. 7; Fig. 9 is a section taken on the line 9—9 of Fig. 1 through the pivotal connection between the lever and the link; Fig. 10 is an end elevation of the device shown in Fig. 9; Fig. 11 is a sectional view showing modification of the pivotal connection of Fig. 10; Fig. 12 is a section taken on the line 12—12 of Fig. 4; Fig. 13 is a section taken on the line 13—13 of Fig. 2; Fig. 14 is an elevation of the shock absorber; Figs. 15 and 16 are diagrammatic illustrations of the anti-roll feature; Fig. 17 is a side elevation of one end of the truck showing the truck wheels supported on the inner sides of the respective wheel supporting arms; and Fig. 18 is an end elevation of the arrangement shown in Fig. 17.

In these drawings I have illustrated one embodiment of my invention and have shown the same as designed for use on a railroad car of conventional construction, but it is to be understood that the truck as a whole, as well as the several parts thereof, may take various forms, may be assembled in various ways, and applied to vehicles of various kinds, without departing from the spirit of the invention.

In the illustrated embodiment the truck comprises a frame 20 extending transversely to the line of movement of the truck and having means for connecting wheel supporting elements, or radius arms, 21 therewith on each side of the frame and adjacent the respective ends thereof. The two radius arms on each side of the truck are provided with bearings 23 to receive an axle 24 with which the wheels 25 are rigidly connected.

The frame may take various forms but is preferably trough shaped and is here shown as semi-circular in cross section and as supported with its open side uppermost. It is preferably formed of heavy sheet metal rolled to shape. The frame is provided at each end with an outwardly extending flange 26 which preferably extends about the full circumference of the semi-circular body of the frame. Lugs 27 are rigidly secured to the outer surface of the frame on each side thereof and adjacent to and spaced inwardly from the respective flanges to provide supports for the inner ends of the wheel supporting arms 21. In the arrangement shown each lug and the adjacent flange 26 are provided with alined openings to receive a tubular pivot pin 28 (Fig. 7) which extends through the bearing opening in the inner end portion of the corresponding wheel supporting arm. Thus each wheel supporting arm is separately connected with the frame for vertical movement about its axis independently of all the other wheel supporting arms. Preferably a sleeve 28a of soft rubber is mounted on the pivot pin 28, and may be vulcanized to the pivot pin and the arm, thereby permitting a slight lateral movement of the outer portion of the wheel supporting arm. The frame being formed of sheet metal is resilient and will yield slightly under unequal forces exerted thereon by the wheel supporting arms, and thus serves to absorb shocks.

Rigidly secured to each end of the frame are two bearings, such as tubular elements 29 which are arranged adjacent to and extend above the respective edges of the side walls of the frame. Rotatably mounted in each bearing is a torque tube 30 which preferably extends lengthwise of the truck to a point near the outer end of the adjacent wheel supporting arm. The inner end of each tube extends inwardly a short distance beyond the inner end of its bearing and has rigidly secured theerto a hanger 31. In the particular arrangement shown the two tubes at each end of the frame are rigidly connected one with the other by a tubular member 32, the end portions of which extend into the respective tubes and which is rigidly secured to both tubes, as by welding. The hangers 31 are preferably in the form of arms which extend downwardly and slightly outwardly from the respective tubes and are provided with means for supporting within the frame 20 a load supporting bolster 33, which is preferably formed of sheet metal and is here shown as substantially rectangular in form. The two hangers at each end of the frame are provided with alined bearings 34 to receive trunnions which in the present instance comprise the end portions of a pivot pin 35 extending through the adjacent portion of the bolster. The bolster 33 is provided on its upper surface with an annular member 33a to receive and support a correspondingly shaped downwardly extending part on the car body, this part of the body being connected with the bolster by the usual king pin, not shown. Preferably brackets 33c are mounted on the bolster on the respective sides of the annular member, and the annular member and brackets are provided with soft rubber pads 33b on which the car body rests, thus permitting slight relative movements of the bolster and car body.

Mounted in each tube 30 is a torsion rod 36 the inner end of which is rigidly connected with the inner end portion of the tube and is thus held against rotation with relation thereto. In the arrangement shown each rod has an enlarged inner end portion 37 provided with longitudinal ribs, or splines, which extend into grooves in the tubular connecting element 32. Each rod extends beyond the outer end of its tube 30 and the tube is provided adjacent its outer end with a bearing 38 to support the rod in axial alinement with the tube. In the present instance the two rods at each end of the frame are formed in one piece but it is immaterial whether they are formed in one piece or in separate pieces as the inner end of each rod is rigid with the connecting element 32.

A lever 39 is rigidly secured to and extends downwardly and inwardly from the outer end portion of each rod 36. In the present instance the rod is provided beyond the end of its tube 30 with a splined portion 40 on which the upper end of the lever 39 is rigidly mounted. The inner and lower end of the lever 39 is connected by a link 41 with the outer end of the adjacent load supporting arm 21, this link extending upwardly and inwardly from its point of connection with the load supporting arm. Preferably the load supporting arm is provided with a reduced outer end portion to receive the bearing at the lower end of the link 41. The bearing and the end portion of the wheel supporting arm may be provided with spherical surfaces constituting a ball and socket joint, shown at 41a, to permit the free relative movements of the link and the arm. The adjacent ends of the lever 39 and of the link 41 are preferably connected by a pivot member 43 on one end of which the lever 39 is rigidly mounted. The other end portion of the pivot member is provided with a spherical bearing surface 44 to conform to a complementary bearing surface 45 in the bearing of the link 41. However, if desired the link 41 may be provided with a cylindrical bearing 46, as shown in Fig. 11, to receive a cylindrical member 47 rigidly secured to the lever 39, a sleeve 48 of soft rubber being interposed between and vulcanized to the bearing 46 and the member 47.

The load on the bolster is supported by the hangers which are rigidly secured to the torque tubes, and when the truck is travelling on a straight track, and is free from lateral forces, as shown in Fig. 15, the weight of the load on the bolster prevents appreciable movement of the bolster, and therefore of the tubes, with relation to the frame, and the torsion rods being rigidly connected at their inner ends with the respective tubes are held normally against rotation. The linkage between the wheel supporting arms and the outer ends of the respective torsion rods is so arranged that the vertical movement of any one of the wheel supporting arms with relation to the frame will impart an upward thrust on the inner end of the lever 39 on the adjacent torsion rod, thereby twisting the outer portion of the rod about its longitudinal axis with relation to the inner portion thereof, and yieldably resisting the movement of the wheel supporting arm. The effective length of the lever 39 decreases as the displacement of the wheel supporting arm increases, and by properly proportioning the linkage, the spring action of the torsion hod may be regulated according to the requirements of its use.

It is customary in the construction of a curved portion of a railway track to elevate the rail at the outer side of the curve above the rail at the inner side thereof, to counteract centrifugal force and maintain the car body in equilibrium when the car is traveling at a given speed. If the car moves on the curve at a speed in excess of said given speed, centrifugal force causes the car body to sway, or "roll" outwardly. When a car equipped with trucks of the type herein described moves about a curve at high speed, the outward swaying of the car body imparts longitudinal movement to the bolster 33 transversely to the truck, and the bolster supporting hangers 31 being rigid with the respective tubes, this transverse movement of the bolster tends to move both the tubes and the torsion rods about longitudinal axes.

In Fig. 16 the truck is shown on a curved track having no superelevation and with the bolster in the position to which it would be moved by a lateral force moving the car body to the right, that is toward the outer side of the curve. The movement of the bolster is proportionate to the roll of the car body and the superelevation of the outer rail would, of course, decrease that roll. When the bolster is so moved to the right the right hand hangers, as viewed in Fig. 16, move outwardly to an increased inclination and the left hand hangers move to substantially vertical positions, thereby tilting the bolster slightly and rotating the tubes 30 in a counterclockwise direction. If the track surface is smooth and no vertical movement is imparted to the wheels the linkage 39—41 holds the outer ends of the torsion rods against rotation and the rotation of the inner ends of the torsion rods with the tubes twists the rods which yieldably resist the movement of the bolster. The rotation of the right hand torsion rods by the hangers exerts a downward force on the levers 39 and the outer ends of those levers being held against downward movement by the contact of the wheels with the track the force so exerted moves the levers 39 about their pivotal connections with the links 41 and thus moves the torsion rods and the tubes upwardly, and this upward movement of the rods, together with the changes in the angular positions of the hangers, imparts upward movement to the right hand end of the bolster and tilts the latter. Conversely the left hand linkage permits the left hand torsion rods to move in the direction in which the left hand hangers move and thus lower the left hand end of the bolster.

If irregularities in the track impart vertical movement to the right hand wheels while centrifugal force imparts transverse movement to the bolster to the right, the linkage will impart clockwise movement to the outer ends of the torsion rods which are connected with the right hand tubes and the inner ends of those torsion rods having been rotated counterclockwise by the displacement of the bolster, the twisting movement of the torsion rods is increased, thereby increasing the spring rate of the right hand rods. At the same time the movement of the bolster will rotate the inner ends of the torsion rods which are connected with the left hand tubes in the same direction as the outer ends of those rods are rotated by the linkage, that is counterclockwise, thereby decreasing the spring rate of the left hand rods when on a smooth track.

In the figures hereinbefore described the truck has been of the inboard type, that is the wheel supporting arms and their bearings are arranged on the inner sides of the wheels. This construction is preferred because it reduces the length of the axles and the other parts of the mechanism and materially reduces the weight of the unsprung parts of the truck. However, an outboard arrangement may be used and in Figs. 17 and 18 the wheels 25a are mounted on the inner sides of the wheel supporting arms 21b and bearings 23a. The ends of each wheel supporting unit are connected by a link 41a with a lever 39a rigidly secured to the outer end of the adjacent torsion rod 36, and the operation is the same as that above described.

The truck may be provided with brake mechanism of any suitable kind but preferably the brake mechanism is of such a character that it can be mounted as a whole on the frame 20 and includes a brake element, such as a brake shoe, for each wheel, a separate actuating device for each brake element and means for separately supporting said actuating devices on the truck frame. In the construction shown in Figs. 1, 2 and 7, there is provided a separate brake unit for each wheel, each unit being of a simple compact construction and the two units on the same side of the truck being controlled by a common actuating device. Each unit comprises a brake shaft 50 rotatably mounted on the frame adjacent one of the wheels 25 and having an eccentric end portion 50a projecting outwardly across the periphery of the adjacent wheel. In the present instance the pivot pin 28 for the wheel supporting arm 21 is tubular and the brake shaft 50 is mounted in that tubular shaft. A brake shoe 51 is mounted on the eccentric portion 50a of the shaft and is preferably pivotally supported thereby. Rigidly secured to the shaft adjacent the extension 50a is a crank arm 52 the outer end of which is connected with the piston rod 53 of a fluid operated actuating device 54. The arrangement of the crank arm with relation to the eccentric extension 50 is such that the outward movement of the piston rod 53 will move the brake shoe into braking contact with the tread of the wheel. In the present instance a single fluid actuated device is connected with the arms of the two brake units on the same side of the truck and is in the nature of an elongate cylinder having therein two opposed pistons 55, and is provided with a fluid inlet 56 through which fluid under pressure may be admitted between the two pistons to simultaneously move the same outwardly and thus simultaneously set the two brakes.

It may also be desirable to provide a shock absorber for cushioning minor movements of the wheel supporting arms. As shown in Figs. 3 and 14 a cylinder 57 is pivotally mounted on a crank arm 58 rigidly secured to the adjacent torque tube 30. A plunger 59 is mounted in the cylinder for reciprocatory movement therein and is pivotally connected at its outer end with the wheel supporting arm on the outer side of the bearing thereon, as shown at 60. Suitable means are arranged within the cylinder 57 to yieldably resist the movement of the plunger 59 and thus resist the movement of the wheel supporting arm with relation to the torque tube.

While I have shown and described one embodiment of my invention, I wish it to be understood that I do not desire to be limited to the details thereof as various modifications may occur to a person skilled in the art.

Having now fully desecribed my invention what I claim as new and desire to secure by Letters Patent is:

1. A truck comprising a transverse frame, wheel supporting elements pivotally connected with said transverse frame adjacent the respective ends thereof, extending lengthwise of the truck and each having an axle bearing, two metallic torsion rods connected with and supported by each end portion of said transverse frame, extending in opposite directions therefrom to points adjacent to the outer ends of the respective wheel supporting elements and held normally against rotation with relation thereto, and means for so connecting each torsion rod with the adjacent wheel supporting element that the movement of the latter on its pivotal axis will twist said torsion rod about its longitudinal axis, thereby yieldably resisting the movement of said wheel supporting element with relation to said frame.

2. A truck comprising a transverse frame, wheel supporting elements pivotally connected with said transverse frame adjacent the respective ends thereof, extending lengthwise of the truck and each having an axle bearing, two metallic torsion rods connected with and supported by each end portion of said transverse frame, extending in opposite directions therefrom to points adjacent to the outer ends of the respective wheel supporting elements and held normally against rotation with relation thereto, arms rigidly secured to the outer ends of the respective torsion rods, links pivotally connected with the respective wheel supporting elements and pivotally connected with the arms of the respective torsion rods.

3. A truck comprising a transverse frame, a pair of wheel supporting arms extending forwardly from said frame, a second pair of wheel supporting arms extending rearwardly from said frame, each of said arms being pivotally mounted on said frame for vertical movement with relation thereto independently of the other arms, and each arm having between its ends an axle receiving bearing, an axle mounted in the bearings of each pair of arms, wheels on said axles, two metallic torsion rods supported at their inner ends on each end portion of said frame and extending in opposite directions lengthwise of the respective wheel supporting arms, the inner end of each of said rods being held normally against rotation and the outer end thereof being free to move about a longitudinal axis with relation to the inner end thereof, and linkage connecting the outer end of each rod with the outer end of the adjacent wheel supporting arm to twist said rod about its longitudinal axis when said outer end of said arm moves vertically with relation to said frame.

4. A truck comprising a transverse frame, a pair of oppositely extending wheel supporting arms pivotally mounted on said frame adjacent each end thereof, each arm having between its ends an axle bearing, connecting elements supported on said frame adjacent the respective ends thereof for movement about axes extending lengthwise of said truck, supporting members rigid with the respective connecting elements, a load supporting bolster connected with said supporting members and supported thereby for movement lengthwise of said frame, a pair of torsion rods adjacent each end of said frame, rigidly connected at their inner ends with the adjacent connecting element and extending in opposite directions lengthwise of said truck, and a connection between each wheel supporting arm and the outer end of the adjacent torsion rod to twist the outer end of said rod with relation to the inner end thereof when said arm moves vertically with relation to said frame, and to prevent the rotation of the outer end of said rod by rotatory movement imparted to the inner end thereof by said bolster.

5. A truck comprising a transverse trough-shaped frame, a pair of oppositely extending wheel supporting arms pivotally mounted on said frame adjacent each end thereof, each arm having between its ends an axle bearing, a pair of bearings secured to said frame at each end thereof, tubes pivotally mounted in the respective bearings and extending lengthwise of the respective wheel supporting arms, hangers secured to said tubes adjacent the respective bearings, a load supporting bolster connected with said hangers and supported thereby on said frame, a torsion rod in each tube rigidly secured thereto adjacent the inner end of said tube and extending beyond the outer end of said tube, and a connection between the outer end of each torsion rod and the adjacent wheel supporting arm to move the outer portion of said torsion rod about its longitudinal axis with relation to the inner portion thereof when said wheel supporting arm moves vertically with relation to said frame.

ALAN R. CRIPE.

REFERENCES CITED

The following references are of record in the file of this patent:

UNITED STATES PATENTS

| Number | Name | Date |
|---|---|---|
| 2,039,274 | Latshaw | Apr. 28, 1936 |
| 2,242,030 | Hicks | May 13, 1941 |
| 2,250,988 | Eksergian | July 29, 1941 |
| 2,273,053 | Ledwinka | Feb. 17, 1942 |
| 2,394,548 | Hickman | Feb. 12, 1946 |
| 2,408,520 | Krotz | Oct. 1, 1946 |

FOREIGN PATENTS

| Number | Country | Date |
|---|---|---|
| 836,307 | France | Jan. 16, 1939 |